United States Patent [19]
Schwenzfeier et al.

[11] Patent Number: 5,351,100
[45] Date of Patent: Sep. 27, 1994

[54] GLASS MULTIFOCAL OPHTHALMIC LENS WITH POLARIZING ELEMENT AND METHOD OF MAKING

[75] Inventors: Ray D. Schwenzfeier; Donald W. Hanson, both of St. Cloud, Minn.

[73] Assignee: BMC Industries, Inc., Minneapolis, Minn.

[21] Appl. No.: 987,737

[22] Filed: Dec. 9, 1992

[51] Int. Cl.$^5$ .................. G02C 7/06; G02C 7/12
[52] U.S. Cl. .................... 351/164; 351/172; 351/177
[58] Field of Search ............... 351/164, 172, 177

[56] References Cited
U.S. PATENT DOCUMENTS 4,645,317  2/1987  Frieder et al. ............... 351/164
4,867,553  9/1989  Frieder ........................ 351/172

Primary Examiner—Scott J. Sugarman
Attorney, Agent, or Firm—Kinney & Lange

[57] ABSTRACT

The present invention includes a glass multifocal light polarizing ophthalmic lens having a glass multifocal lens portion with a multifocal element fused to a convex outer surface of the multifocal lens portion, a single vision lens portion opposing the multifocal lens portion and a polarizing film sandwiched between the multifocal lens portion and the single vision lens portion. The present invention also includes a method for making the glass multifocal light polarizing ophthalmic lens.

7 Claims, 1 Drawing Sheet

GLASS MULTIFOCAL OPHTHALMIC LENS WITH POLARIZING ELEMENT AND METHOD OF MAKING

BACKGROUND OF THE INVENTION

The present invention relates to a glass multifocal ophthalmic lens having a light polarizing element.

Individuals wearing multifocal ophthalmic lenses made of glass have had to choose among the options of protecting their eyes from harmful rays of the sun or adequately compensating for an ocular lens accommodation deficiency from which they suffer or wearing uncomfortable spectacles. The choice arises because many of the glass ophthalmic lenses presently available either protect an individual's eyes from sunlight but do not include a multifocal element or include a multifocal element but not a light-protecting element. The glass lenses that are available having both a multifocal element and a light-protecting element tend to be heavy and uncomfortable to wear. Other lenses having a multifocal element and a light-protecting element have a limited resistance to abrasion.

Attempts to make a multifocal lens having protection against harmful rays from the sun have included a composite laminated lens described by the Ace U.S. Pat. No. 4,679,918, issued Jul. 14, 1987. The Ace patent describes an ophthalmic lens having a photochromic glass portion. The photochromic glass portion includes a glass bifocal element that is adhered to a front surface of the photochromic glass portion. The bifocal element is not made with photochromic glass.

One particular lens described in the Ace patent also includes a plastic lens portion and an adhesive layer that binds the photochromic glass lens portion to the plastic lens portion. The Ace patent also describes a lens having a polarizing film embedded in the adhesive layer. However, this lens does not include a bifocal element.

The Marks et. al. patent, U.S. Pat. No. 4,923,758, issued May 8, 1990, describes a method for adhering a polarizing film to a curved lens surface. The method includes preforming the polarizing film in a manner that minimizes a hardening or drying effect. The polarizing film is then laminated to the curved lens surface. Air is excluded during lamination by a method that includes spinning the lens.

The Marks et. al. patent describes how a bifocal segment protruding from a lens and facing a polarized film causes the film to disorient due to a build up of fluid such as a softening fluid which is retained in gaps formed by the Marks et. al. process. The Marks et. al. patent describes a solution to this problem as applying the polarized film to the entire lens and then stripping the film away from a bottom portion of the lens in order to aid in draining fluid from the lens. Marks et. al. also describe how a smooth lens portion covered with the polarizing film is cemented to a smooth bifocal member to make a bifocal progressive single vision wafer lens.

SUMMARY OF THE INVENTION

The present invention includes a glass multifocal light polarizing ophthalmic lens having a glass multifocal lens portion with a convex outer surface, a concave inner surface, and a multifocal element fused to the convex outer surface and a glass single vision lens portion with a convex inner surface and a concave outer surface. The multifocal light polarizing lens also includes a light polarizing film having a convex surface that adheres to the inner concave surface of the multifocal lens portion and a concave surface that adheres to the convex inner surface of the single vision lens portion.

The present invention also includes a method for making the glass multifocal light polarizing lens that includes providing a multifocal glass lens portion having a convex outer surface, a concave inner surface and a multifocal element fused to the convex outer surface. The method also includes providing a single vision glass lens portion having a convex inner surface and a concave outer surface and providing a light polarizing film.

The light polarizing film is adhered to the multifocal lens portion by applying an adhesive to the concave inner surface of the multifocal lens portion and pressing the polarizing film onto the adhesive. Next, the adhesive is applied to the polarizing lens and the convex surface of the single vision lens portion is pressed onto the polarizing film.

DETAILED DESCRIPTION OF THE PREFERRED EMBODIMENTS

Figure 1:
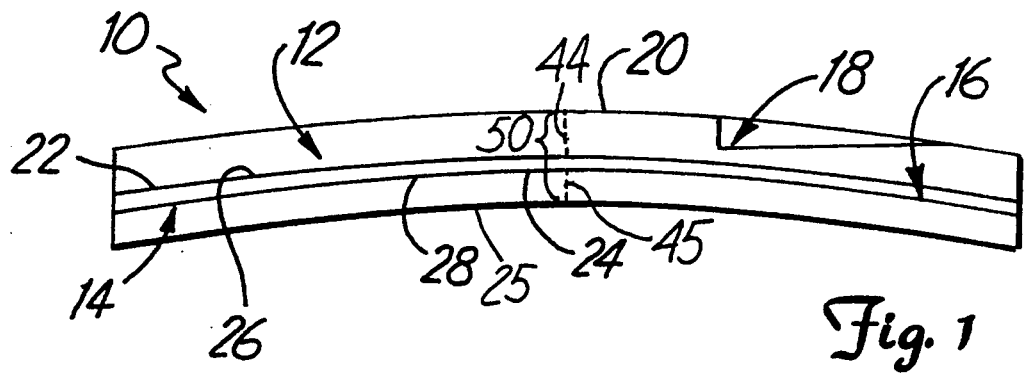
FIG. 1 is an elevational view of one embodiment of the glass ophthalmic multifocal light polarizing lens of the present invention.

A multifocal light polarizing glass ophthalmic lens of the present invention, illustrated for one embodiment at 10 in FIG. 1, includes a front glass multifocal lens portion 12 having an outer convex surface 20 with a multifocal element 18 fused to the outer convex surface 20, a rear glass single vision lens portion 14 opposing the front glass multifocal lens portion 12, and a light polarizing film 16 sandwiched between the front glass multifocal lens portion 12 and the rear glass single vision lens portion 14. The present invention also includes a method for making the multifocal light polarizing glass spectacle lens that includes providing the glass multifocal lens portion 12 with the multifocal element 18 fused to the outer convex surface 20 and providing the glass single vision lens portion 14. The method also includes providing the light polarizing film 16 and sandwiching the light polarizing film 16 between the front multifocal lens portion 12 and the rear single vision lens portion 14 with an adhesive.

By "front" multifocal glass lens portion 12 is meant that when the ophthalmic lens 10 is finished and is worn in a pair of spectacles, the multifocal glass lens portion 12 is on a side opposing the wearer. By "rear" single vision lens portion 14 is meant that the single vision lens portion 14 faces an eye of the wearer.

The glass ophthalmic lens 10 illustrated in FIG. 1 is a semifinished lens. By "semifinished" is meant that the convex outer surface 20 of the multifocal lens portion 12 has a curvature which is finished to a selected radius of curvature but not to a specific prescription. To finish the ophthalmic lens 10, a concave outer surface 25 of the single vision lens portion 14, opposed to the convex outer surface 20, may be further ground and polished to a spherical or a cylindrical curvature in accordance with a desired ophthalmic prescription.

Figure 2:
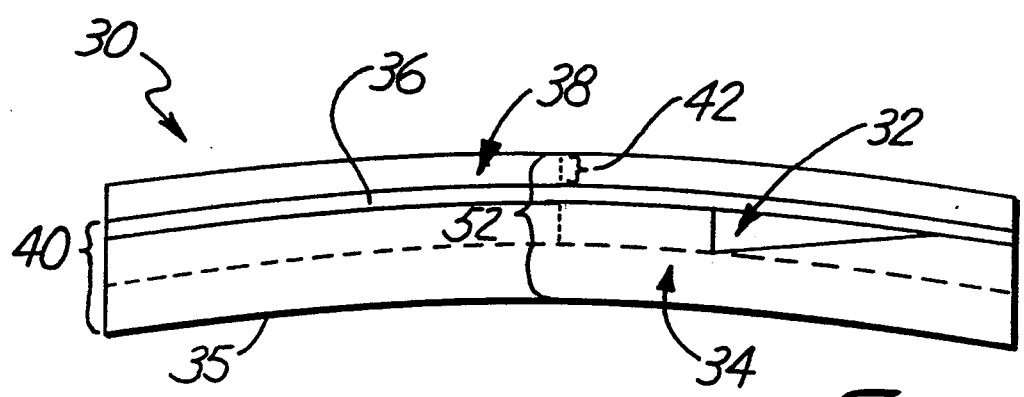
FIG. 2 is an elevational view of a prior art glass ophthalmic multifocal light polarizing lens.

The glass ophthalmic lens 10 of the present invention is an improvement over one widely manufactured prior art glass lens illustrated at 30 in FIG. 2 having a multifocal element 32 positioned in a rear lens portion 34 so that the multifocal element 32 faces a polarizing film 36. This lens 30 includes a front lens portion 38 that is typically about 1.4 millimeters thick. The thickness of 1.4 millimeters is believed to be necessary for proper handling of the lens. A minimum center thickness for this type of lens 30 is a sum of the center thickness 42 of the front lens portion 38, about 1.4 millimeters, and an extra thickness 40 that is approximately equal to the thickness of an add power of the multifocal element 32.

One benefit of fusing the multifocal element 18 to an outer convex surface 20 of the glass multifocal lens portion 12 of the present invention is that the thickness of the ophthalmic lens 10 can be decreased and thus the weight of the lens can be decreased. Specifically, a minimum center thickness 44 of the multifocal lens portion 12 is dependent upon the thickness of the multifocal segment 18. However the minimum center thickness 45 of the single vision lens portion 14 is not dependent upon the multifocal element 18 and may be as little as 0.2 millimeters.

The thickness of the lens 10 of the present invention is decreased as compared to the prior art lens 30 having the multifocal element 32 positioned in the rear lens portion 34. The minimum center thickness 45 of the rear glass single vision lens portion 14 of the present invention is not dependent upon the thickness of the multifocal element 18 as is the minimum center thickness of the rear lens portion 34 of the prior art lens 30. Further, the single vision lens portion 14 of the present invention, having a minimum thickness of 0.2 millimeters after finishing, is much thinner than the front lens portion 38 of the prior art lens 30 at 1.4 millimeters.

One other benefit of the lens of the present invention 10 is a greater versatility in finishing the lens with the wearer's prescription as compared to the prior art lens 30. Finishing the prior art lens 30 requires a compensation for the combined thickness of the front lens portion 38 and the multifocal element 32. The compensation limits corrections involving minus power and plus power because the corrections would require undesirable grinding of the bifocal element 32.

The lens of the present invention 10 requires a compensation for the thickness of the multifocal element 18 only. Thus, corrections involving minus and plus power are not limited. The lens 10 is finishable in a manner that precludes any undesirable grinding of the multifocal element 18 by a removal of material from the outer concave surface 25.

The convex outer surface 20 of the glass multifocal lens portion 12 of the multifocal glass light polarizing spectacle lens 10 is substantially parallel to the concave inner surface 22. The glass multifocal lens portion 12 is preferably made of an optical quality glass. In the most preferred embodiment, the lens portion 12 is made from an S-1 ophthalmic glass obtained from Schott Glass Technologies of Duryea, Pa. In another preferred embodiment, the ophthalmic glass is obtained from Corning Glass Works of Corning, N.Y., and has a Corning identification number of 8361.

In one other embodiment, the lens portion 12 is made from an ophthalmic photochromic glass. Acceptable photochromic glasses include glasses obtained from Corning Glass Works of Corning, N.Y. and having a Corning identification number of 8112, 8123, or 8143 or having the identification Fusable Photogray II TM, Fusable Photogray Extra TM, or Fusable Photobrown Extra TM.

The glass of the multifocal lens portion 12 has an index of refraction that remains essentially unchanged from melt-to-melt. The glass is not fogged or cloudy. The glass has a softening temperature high enough to prevent distortion of a curve during a bifocal fusion process.

The multifocal element 18 is fused to the convex surface 20 of the multifocal lens portion 12. The multifocal element 18 is acceptably made from one of the ophthalmic glasses of the group of S-1000, S-1004, and S-1010, manufactured by Schott Glass Technologies of Duryea, Pa. In other acceptable embodiments, the multifocal element 18 is made from one of the ophthalmic glasses obtained from Corning Glass Works of Corning N.Y., identified by Corning Glass numbers 8323, 8316, and 8078.

In one other embodiment, the multifocal element is made from an ophthalmic barium photochromic glass. Acceptable photochromic glasses include ophthalmic photochromic glasses available from Corning Glass Works of Corning, N.Y., having Corning identification numbers of 8082, 8087 and 8088.

The multifocal element 18 could be a bifocal element or a trifocal element. The bifocal element may include a crowned upper component (not shown) made of a glass which is identical to that of the multifocal lens portion 12 and a barium component (not shown) that corrects for reading vision requirements. The barium component is made of an ophthalmic glass having a concentration of about 20 to 50% barium oxide.

Prior to installation on the multifocal glass portion 12 of the ophthalmic lens 10, the individual components of the multifocal element 18 are fused together. The multifocal element 18 is ground and is polished to fit within a countersink depression that is ground and is polished into the convex outer surface 20 of the glass multifocal lens portion 12. The multifocal element 18 is ground flat on edges to ensure a proper fusion. The multifocal element 18 is fitted within the countersink and is fused to the glass multifocal lens portion 12 under extremely high heat. Once the multifocal element 18 is fused to the convex outer surface 20 of the glass multifocal lens portion 12, the convex outer surface 20 is semi-finished to remove excess glass from the multifocal element 18, to provide a uniform curve to the convex outer surface 20 and to bring the multifocal segment 18 into proper proportion. The convex outer surface 20 is then finely ground and is polished to a precise optical finish.

The concave inner surface 22 of the glass multifocal portion 12 is also finely ground and polished. The surfaces of the lens 10 are ground in a manner that does not form waves. Preferably, the surfaces are ground to a curvature that does not vary by more than 0.06 diopters.

The multifocal element 18 has a diameter within a range of about 18 to 35 millimeters. Table 1 describes a tolerance and an acceptable range of diameters within this range.

TABLE 1

| Size | Tolerance | Range |
| --- | --- | --- |
| 18 mm | ±0.5 | 17.5 mm–18.5 mm |
| 20 mm | −0.75 | 19.25 mm–20.0 mm |
| 22 mm | ±0.5 | 21.5 mm–22.5 mm |
| 23 mm | ±0.5 | 22.5 mm–23.5 mm |
| 24 mm | −0.5 + 0.75 | 23.5 mm–24.75 mm |
| 25 mm | −0.5 + 0.75 | 24.5 mm–25.75 mm |
| 28 mm | −0.5 + 0.75 | 27.5 mm–28.75 mm |

TABLE 1-continued

| Size | Tolerance | Range |
| --- | --- | --- |
| 35 mm | −0.5 + 0.75 | 34.5 mm–35.75 mm |

In one preferred embodiment, the multifocal element 18 of the multifocal lens portion 12 has a diameter of 25 millimeters. In another preferred embodiment, the multifocal element 18 of the multifocal lens portion 12 has a diameter of 28 millimeters. For each diameter embodiment, are embodiments of curvature for the convex outer surface 20. The embodiments include a curvature of 4 diopters, a diopter being approximately the inverse of the focal length of the lens in meters, with 1.00 to 3.00 diopters of add power. Preferred minimum center thicknesses for multifocal elements in curvature embodiments within this range are shown in Tables 2 and 3.

In other preferred embodiments, the convex outer surface 20 includes curvatures of 6 and 8 diopters, respectively, each with 1.00 to 3.00 diopters add power. Preferred center thicknesses for multifocal element 18 embodiments within this range are also shown in Tables 2 and 3. Acceptable embodiments include virtually all types of multifocal glass lenses.

TABLE 2

LENS EMBODIMENTS FOR MULTIFOCAL ELEMENT OR 25 MM DIAMETER

| Base | Add | Multifocal Element Thickness in mm | Minimum Thickness in mm of Lens Embodiment shown at 30 | Minimum Thickness of Lens of Present Invention, mm |
| --- | --- | --- | --- | --- |
| 4 | 1.00 | 1.3 | 2.9 | 1.5 |
|   | 1.25 | 0.9 | 2.5 | 1.1 |
|   | 1.50 | 1.0 | 2.6 | 1.2 |
|   | 1.75 | 1.2 | 2.8 | 1.4 |
|   | 2.00 | 1.3 | 2.9 | 1.5 |
|   | 2.25 | 1.5 | 3.1 | 1.7 |
|   | 2.50 | 1.6 | 3.2 | 1.8 |
|   | 2.75 | 1.8 | 3.4 | 2 |
|   | 3.00 | 2.0 | 3.6 | 2.2 |
| 6 | 1.00 | 1.3 | 2.9 | 1.5 |
|   | 1.25 | 0.9 | 2.5 | 1.1 |
|   | 1.50 | 1.0 | 2.6 | 1.2 |
|   | 1.75 | 1.2 | 2.8 | 1.4 |
|   | 2.00 | 1.3 | 2.9 | 1.5 |
|   | 2.25 | 1.5 | 3.1 | 1.7 |
|   | 2.50 | 1.6 | 3.2 | 1.8 |
|   | 2.75 | 1.8 | 3.4 | 2 |
|   | 3.00 | 2.0 | 3.6 | 2.2 |
| 8 | 1.00 | 1.3 | 2.9 | 1.5 |
|   | 1.25 | 1.7 | 3.3 | 1.9 |
|   | 1.50 | 1.0 | 2.6 | 1.2 |
|   | 1.75 | 1.2 | 2.8 | 1.4 |
|   | 2.00 | 1.3 | 2.9 | 1.5 |
|   | 2.25 | 1.5 | 3.1 | 1.7 |
|   | 2.50 | 1.6 | 3.2 | 1.8 |
|   | 2.75 | 1.8 | 3.4 | 2 |
|   | 3.00 | 2.0 | 3.6 | 2.2 |

TABLE 3

LENS EMBODIMENTS FOR MULTIFOCAL ELEMENT OR 28 MM DIAMETER

| Base | Add | Multifocal Element Thickness in mm | Minimum Thickness in mm of Lens Embodiment shown at 30 | Minimum Thickness of Lens of Present Invention, mm |
| --- | --- | --- | --- | --- |
| 4 | 1.00 | 1.6 | 3.2 | 1.8 |
|   | 1.25 | 1.0 | 2.6 | 1.2 |
|   | 1.50 | 1.3 | 2.9 | 1.5 |
|   | 1.75 | 1.5 | 3.1 | 1.7 |
|   | 2.00 | 1.6 | 3.2 | 1.8 |
|   | 2.25 | 1.9 | 3.5 | 2.1 |
|   | 2.50 | 2.1 | 3.7 | 2.3 |
|   | 2.75 | 2.3 | 3.9 | 2.5 |
|   | 3.00 | 2.5 | 4.1 | 2.7 |
| 6 | 1.00 | 1.6 | 3.2 | 1.8 |
|   | 1.25 | 1.0 | 2.6 | 1.2 |
|   | 1.50 | 1.3 | 2.9 | 1.5 |
|   | 1.75 | 1.5 | 3.1 | 1.7 |
|   | 2.00 | 1.6 | 3.2 | 1.8 |
|   | 2.25 | 1.9 | 3.5 | 2.1 |
|   | 2.50 | 2.1 | 3.7 | 2.3 |
|   | 2.75 | 2.3 | 3.9 | 2.5 |
|   | 3.00 | 2.5 | 4.1 | 2.7 |
| 8 | 1.00 | 1.6 | 3.2 | 1.8 |
|   | 1.25 | 2.0 | 3.6 | 2.2 |
|   | 1.50 | 1.3 | 2.9 | 1.5 |
|   | 1.75 | 1.5 | 3.1 | 1.7 |
|   | 2.00 | 1.6 | 3.2 | 1.8 |
|   | 2.25 | 1.9 | 3.5 | 2.1 |
|   | 2.50 | 2.1 | 3.7 | 2.3 |
|   | 2.75 | 2.3 | 3.9 | 2.5 |
|   | 3.00 | 2.5 | 4.1 | 2.7 |

Preferably, the convex outer surface 20 is ground using a glass diamond wheel. The convex outer surface 20 is subjected to a finishing and polishing step using conventional lens finishing and polishing pads and polish.

The light polarizing film 16 includes a convex surface 26 that contacts the inner concave surface 22 of the glass multifocal lens portion 12. The light polarizing film 16 also includes a concave surface 28 that contacts the convex inner surface 24 of the glass single vision lens portion 14. The light polarizing film 16 is a polyvinyl alcohol and iodine film and is preferably obtained from Tanaka Light Chemical of Cosmos Optical of Osaka, Japan. The light polarizing film 16 is preferably manufactured by Nakanishi Optical Products of Japan.

The light polarizing film 16 is attached to the inner concave surface 22 of the glass multifocal lens portion 12 by an adhesive. The adhesive is most preferably an epoxy adhesive, Magnaacryl 2510, obtained from Beacon Chemical Co. of Mount Vernon, N.Y. The adhesive is curable by exposure to ultraviolet light. The light polarizing film 16 is also adhered to the inner convex surface 28 of the glass single vision lens portion 14 by the same adhesive as is used to adhere the multifocal lens portion 12.

The single vision lens portion 14 is made from the same optical grade glass as is the glass multifocal lens portion 12. The single vision lens portion has a curvature that is compatible with the curvature of the multifocal lens portion 12. In one preferred embodiment, the single vision lens portion has a minimum center thickness of about 0.2 millimeters. The thickness of 0.2 millimeters is believed to be the minimum thickness necessary to maintain the integrity of the single vision lens portion 14.

The minimum center thickness 50 for various curvatures of the glass multifocal light polarizing lens 10 Of the present invention is shown in Table 2 for a multifocal element 18 diameter of 25 millimeters and in Table 3 for a multifocal element 18 diameter of 28 millimeters.

The minimum center thickness 52 for a corresponding widely manufactured prior art lens such as is illustrated at 30 in FIG. 2 is also shown in Tables 2 and 3. As can be seen, the minimum center thickness 50 of the multifocal lens of the present invention 10 is less than the minimum center thickness 52 of the widely manufactured lens for every case considered. In a majority of cases, the thickness is reduced by more than 1 millimeter in the lens 10 of the present invention.

In one preferred embodiment for a multifocal light polarizing lens 10 having a multifocal element 18 with a diameter of about 25 millimeters, the minimum center thickness 50 of the lens 10 ranges from about 1.1 to 2.2 millimeters depending upon the add power for each of the curvatures of 4, 6, and 8 diopters. In one other preferred embodiment for a multifocal light polarizing lens 10 having a multifocal element 18 with a diameter of about 28 millimeters, the minimum center thickness 50 of the lens ranges from about 1.2 to 2.7 millimeters for each of the curvatures of 4, 6, and 8 diopters, depending upon the add power.

The glass multifocal light polarizing lens 10 of the present invention is constructed by providing a multifocal lens portion 12 having a curvature within the range described in Tables 2 and 3. Also provided is the single vision lens portion 14 having curvature compatible with the curvature of the multifocal lens portion 12 and having a minimum center thickness of about 0.2 millimeters. The diopteric curvature of the multifocal lens portion 12 and the single vision lens portion 14 most preferably comply with the lens standard described in ANSI Z80.1-1987. The standard is verified with a calibrated standard of power that is certified by the National Institute of Standards and Technology.

The multifocal lens portion 12 is placed on a holding device with the inner concave surface 22 facing upwards. Two grams of the epoxy adhesive are placed in a mechanical center of the multifocal lens portion 12. The adhesive is positioned on the concave lens surface 22 with a dispenser so that the adhesive does not entrap air.

The light polarizing film 16 is curved to a spherical radius that is essentially the same as the spherical radius of the concave surface 22 of the multifocal lens portion 12 by methods known in the art. The polarizing film 16 is slowly introduced onto the adhesive to permit the film to be wetted by the adhesive. This step prevents air bubbles from forming and becoming entrapped within a bond line formed by the adhesive.

Next, adhesive is applied to the concave surface 28 of the light polarizing film 16 in the same manner as described for the concave surface 22 of the multifocal lens portion 12. The convex surface 24 of the single vision lens portion 14 is positioned onto the adhesive and is pressed with finger tip pressure to squeeze the adhesive to an outside edge of the lens.

The glass multifocal light polarizing lens 10 is then inspected with an incandescent lamp for visible contaminants or entrapped air. The lens is subjected to a substantially uniform force of about 20 pounds to produce thin adhesive lines. The lens is again inspected for visible contaminants and entrapped air. If the lens is free of contaminants, the lens is cured.

Preferably, the lens is cured by exposure to ultraviolet light for about 10 seconds. In one embodiment, curing is performed with a Super Six UV Lamp system manufactured by Fusion UV Curing System of Rockville, Md. Acceptable lamp sources are of a D type and emit ultraviolet light at a wavelength of 300 to 400 nanometers.

Acceptable multifocal polarizing lenses 10 of the present invention include three or fewer pits, scratches and hairlines of a size greater than 0.1 millimeters. An interface where the multifocal element 18 meets the multifocal lens portion 12 is essentially free of pits, scratches and hairlines that are greater than 0.063 millimeters.

Although the present invention has been described with reference to preferred embodiments, workers skilled in the art will recognize that changes may be made in form and detail without departing from the spirit and scope of the invention.

What is claimed is:

1. A multifocal glass light polarizing ophthalmic lens comprising:
   a glass multifocal lens portion having a convex outer surface, a concave inner surface and a multifocal element fused to the convex outer surface;
   a glass single vision lens portion having a convex inner surface and a concave outer surface; and
   a light polarizing film having a convex surface that adheres the concave inner surface of the glass multifocal lens portion and having a concave surface that adheres the convex inner surface of the glass single vision lens portion.

2. The glass ophthalmic lens of claim 1 wherein the single vision lens portion has a minimum center thickness of about 0.2 millimeters after completion of grinding and polishing to a patient's prescription.

3. The glass ophthalmic lens of claim 1 having a multifocal element with a diameter of about 28 millimeters and having a minimum center thickness of not more than about 2.7 millimeters at an add power of 3.00 diopters.

4. The glass ophthalmic lens of claim 1 having a multifocal element with a diameter of about 25 millimeters and having a minimum center thickness of not more than about 2.2 millimeters at an add power of 3.00 diopters.

5. A method for making a glass multifocal light polarizing lens comprising:
   providing a glass multifocal lens portion having a convex outer surface and a concave inner surface and having a multifocal element fused to the convex outer surface;
   providing a glass single vision lens portion having a convex inner surface and a concave outer surface;
   providing a light polarizing film that is sandwiched between the glass multifocal lens portion and the glass single vision lens portion;
   applying an adhesive to the concave surface of the multifocal lens portion; contacting the polarizing film to the adhesive;
   applying an adhesive to an exposed surface of the polarizing film;
   contacting the convex surface of the single vision lens portion to the adhesive;
   curing the lens; and
   finishing the concave outer surface of the single vision lens portion in accordance with a wearer's prescription.

6. The method of claim 4 wherein the lens is cured by exposure to ultraviolet light.

7. The method of claim 5 wherein the single vision lens portion has a minimum center thickness of about 0.2 millimeters upon completion of grinding and polishing to a patient's prescription.

* * * * *

UNITED STATES PATENT AND TRADEMARK OFFICE
CERTIFICATE OF CORRECTION

PATENT NO. : 5,351,100

DATED : September 27, 1994

INVENTOR(S) : RAY D. SCHWENZFEIER, DONALD W. HANSON

It is certified that error appears in the above-indentified patent and that said Letters Patent is hereby corrected as shown below:

Col. 6, line 65, delete "Of", insert --of--

Col. 8, lines 53-55, delete "applying an adhesive to the concave surface of the multifocal lens portion; contacting the polarizing film to the adhesive;"

insert --applying an adhesive to the concave surface of the multifocal lens portion;

contacting the polarizing film to the adhesive;--

Signed and Sealed this

Fourteenth Day of March, 1995

*Attest:*

BRUCE LEHMAN

*Attesting Officer*   *Commissioner of Patents and Trademarks*